(12) United States Patent
Dagtas (10) Patent No.: US 6,829,778 B1
(45) Date of Patent: Dec. 7, 2004

(54) METHOD AND SYSTEM FOR LIMITING REPETITIVE PRESENTATIONS BASED ON CONTENT FILTERING

(75) Inventor: Serhan Dagtas, Croton-On-Hudson, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 739 days.

(21) Appl. No.: 09/709,266

(22) Filed: Nov. 9, 2000

(51) Int. Cl.[7] .......................... H04N 9/00; H04N 7/16
(52) U.S. Cl. ........................ 725/22; 348/460; 386/46
(58) Field of Search ........................ 348/553, 460, 348/634, 473, 474; 725/22, 19, 20; 386/46, 94; H04N 9/00, 7/16

(56) References Cited

U.S. PATENT DOCUMENTS

| | | | | |
|---|---|---|---|---|
| 4,805,020 A | * | 2/1989 | Greenberg | 348/460 |
| 4,931,871 A | * | 6/1990 | Kramer | 348/460 |
| 5,070,404 A | * | 12/1991 | Bullock et al. | 348/460 |
| 5,668,917 A | | 9/1997 | Lewine | 386/52 |
| 5,812,732 A | | 9/1998 | Dettmer et al. | 386/48 |
| 5,870,754 A | | 2/1999 | Dimitrova et al. | 707/104 |
| 5,999,689 A | * | 12/1999 | Iggulden | 386/46 |
| 6,100,941 A | | 8/2000 | Dimitrova et al. | 348/700 |
| 6,425,127 B1 | * | 7/2002 | Bates et al. | 725/32 |
| 6,469,749 B1 | * | 10/2002 | Dimitrova et al. | 348/722 |

* cited by examiner

*Primary Examiner*—Michael H. Lee
(74) *Attorney, Agent, or Firm*—Laurie Gathman (57) ABSTRACT

A method of limiting the number of presentations or observations of information items, such as advertising images, that are repetitively distributed among a plurality of transmitted materials is presented. In accordance with the principles of the invention, information items are compared, using identifiable properties, to similarly identified information items that have been previously received and stored in a dynamically created and updated data base of information items. When a count of number of the occurrences of a selected information item with same, or substantially similar, identifiable properties achieves a selectively set threshold value, the selected information item is precluded from being presented or observed in subsequent transmissions or broadcasts.

28 Claims, 9 Drawing Sheets

| CONTENT | MAX. OCC. | # OCC. | DATE |
|---------|-----------|--------|------|
| $C_1$ | 2 | 1 | |
| $C_2$ | 2 | 2 | |
| $C_3$ | 2 | 2 | |
| $C_4$ | 2 | 2 | |
| | | | |
| $C_n$ | 2 | 1 | |
| | | | |

FIG. 9

METHOD AND SYSTEM FOR LIMITING REPETITIVE PRESENTATIONS BASED ON CONTENT FILTERING

FIELD OF THE INVENTION

This invention relates to content based filtering techniques. More specifically, to a method of limiting the number of observations of a repeating information item.

BACKGROUND OF THE INVENTION

In commercial television broadcast, whether are by wireless radio frequency broadcast, cable or satellite transmission, a significant portion of the broadcast time is devoted to advertisements for products, upcoming programming or station identification. For example, in the United States, network television broadcasts, product advertisements, i.e., commercials, are distributed within the theatrical portion of the broadcast regularly at 15 minute intervals. In some cases, the distribution of the theatrical image are more frequent, occurring, for example, at ten minute intervals.

Commercial and other non-theatrical interruptions, while needed to fund the production and transmission of television programs, become an annoyance to the viewer, as the same non-theatrical images are repeated in a single broadcast or, even, over multiple broadcasts of the same or different programs. The viewer is subjected to such a barrage of repetitive commercial content in order to impose the message upon the user.

Techniques for extracting commercials and other non-theatrical information items in a television broadcast are well known in the art. See, for example, U.S. Pat. No. 5,668,917, entitled, Apparatus and Method for Detection of Unwanted Broadcast, issued Sep. 16, 1997 to Lewine. Techniques disclosed therein may be used to remove all commercial and non-theatrical information from a received broadcast. However, removing all commercials and non-theatrical information items is not advantageous, as some commercial and non-theatrical information items provide information that is useful and helpful for a viewer. For example, the announcement of a future feature presentation is useful in making the viewer aware of such upcoming events. However, repeating the same announcement, within the same or even over multiple broadcasts, provides no additional information to a viewer. Similarly, repeating a weather pattern or a traffic report, which includes no additional information than a previously reported weather pattern or traffic report is merely an annoyance to a viewer or listener.

Thus, there is a need to selectively filter non-theatrical information content from broadcast transmissions to allow a limited number of viewing occurrences of new, or previously observed, commercial or non-theatrical content so as to avoid excessive repetition of commercial or non-theatrical information content.

SUMMARY OF THE INVENTION

A method of limiting the number of observations of repetitive non-theatrical images from transmission signals containing theatrical images and non-theatrical images is disclosed. The method uniquely identifies each non-theatrical image using a signature that is developed, preferably, from an audio component of the non-theatrical image. The identifiers are recorded in a data base and a count of the occurrence of each non-theatrical image is maintained. When a selectively set known number of occurrences of a specific image is determined, the specific image is precluded from being viewed further. The dynamically constructed data base may further be applied to other transmission signals to preclude the viewing of non-theatrical images that are recorded in the data base and repeated in the other transmission signals.

Other features of the present invention will become apparent from the following detailed description considered in conjunction with the accompanying drawings.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

Figure 1A:
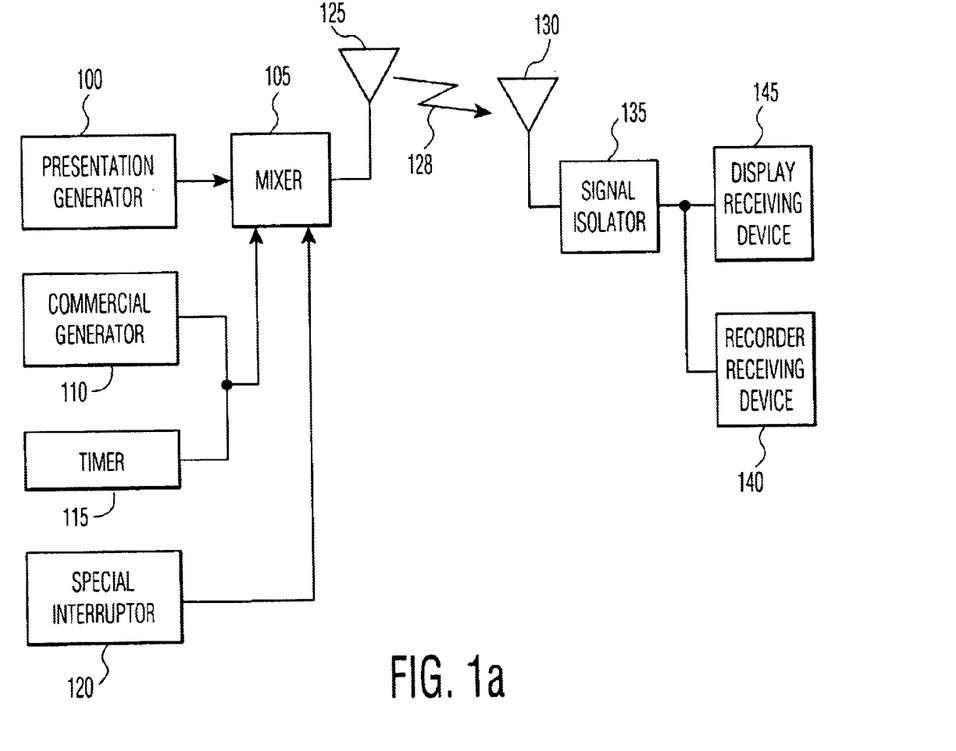
FIG. 1a illustrates an exemplary television broadcast transmission and receiving configuration.

FIG. 1a illustrates an exemplary television broadcast system wherein presentation generator 100 provides a theatrical video image and corresponding audio to mixer/transmitter 105, which is coupled to a transmission means, such as antenna 125, or not shown, a cable distribution network, a satellite network. Commercial generator 110, in conjunction with timer 115, provides at least one non-theatrical video and audio image to mixer/transmitter 105 on a timed or periodic basis. Thus, a series of images not related to the theatrical presentation, such as advertising, commercials, news, weather, traffic, messages, may be interposed into the transmitted presentation image on a periodic or timed basis. Similarly, special interruption generator 120, connected to mixer/transmitter 105, may be used to interpose a non-theatrical video image and corresponding audio signal, such as an emergency weather, traffic, disaster warning reports, etc., into, in this illustrated example, transmitted signal 128.

Transmitted signal 128 when received by a corresponding receiving means, in this illustrative example, antenna 130, is then processed by signal isolator 135. Signal isolator 135 is a tunable receiving system, such as a television receiver, that isolates one television signal from other television signals in transmitted signal 128. The isolated television signal may then be displayed, as illustrated, on display device 145, e.g., a television set, a computer monitor, a liquid crystal display, etc. The isolated television signal may also be recorded on a recording device 140. Video recording devices are well known in the art. For example, for analog television transmission, video cassette recorders (VCR) are a well known technology. For digital television transmission, digital video recorders, for example ReplayTV®, TiVo® may be used to record the digitally transmitted image.

Figure 1B:
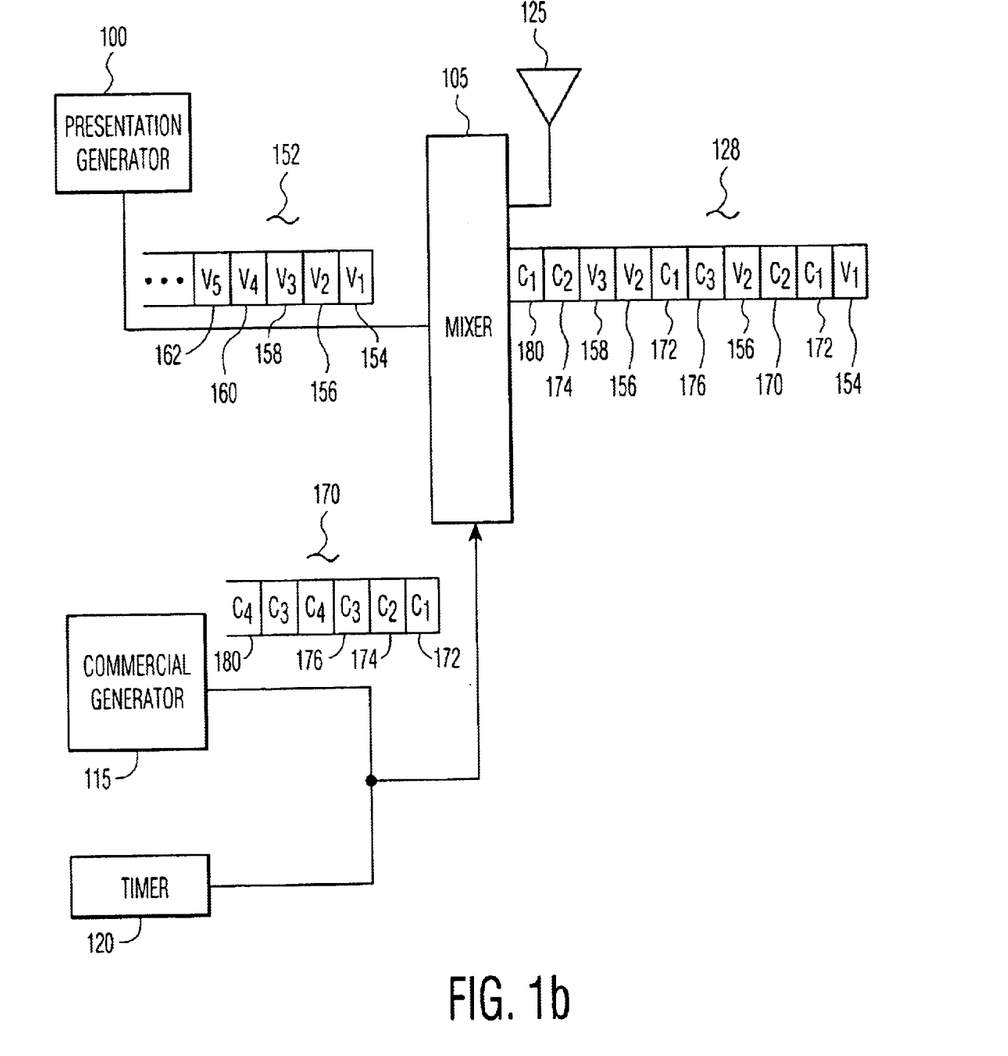
FIG. 1b illustrates a formation of an exemplary transmission broadcast signal.

FIG. 1b illustrates the creation of transmitted signal 128 by the merging of theatrical image 152, generated by presentation generation 100, and non-theatrical (commercial) image 170, generated by commercial generator 115. In this exemplary example, theatrical image 152 is composed of image sections $V_1$ 154, $V_2$ 156, $V_3$ 158, $V_4$ 160, $V_5$ 162, etc., and commercial image 170 is composed on image sections $C_1$ 172, $C_2$ 174, $C_3$ 176, $C_4$ 180, etc. As would be appreciated, the order of the theatrical image is sequentially fixed to provide a coherent theatrical broadcast. However, the order of the commercial, or non-theatrical images, may be distributed throughout the theatrical broadcast according to the desire of presenting the commercial image in a particular manner. For example, there may be a desire to present the commercial image a known number of times within a theatrical broadcast, or there may be a desire to have the same image occur in sequential commercial intervals. Timer 120 is used to determine the time period that commercial images are interposed in theatrical image 152, while the order of the commercial images is determined by generator 115. In this exemplary illustration, two commercial images are typically interposed into transmitted image 128 at each time interval as determined by timer 120. Accordingly, transmitted image 128 contains two commercial images after each theatrical image. It would be appreciated that images $V_1$ 154 and $V_2$ 156 need not be sized to accommodate the interruption by commercial images $C_1$ 172, and $C_2$ 174, but, rather may be interrupted at a rate specified by timer 120. The interrupted theatrical image is then continued at the completion of the commercial interruption. For example, in the illustrative example, image $V_2$ 156 is interrupted by commercial image $C_3$ 176 and a second occurrence of image $C_1$ 172. In this case, image $V_2$ 156 is merely continued after the end of the interruption.

Figure 2:
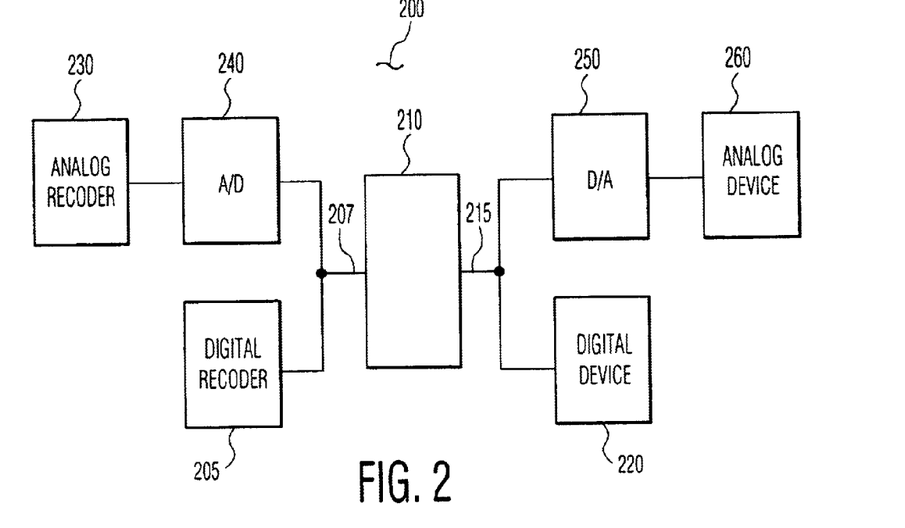
FIG. 2 illustrates an exemplary system using the principles of the invention.

FIG. 2 illustrates an exemplary implementation of the present invention wherein a theatrical presentation has been previously recorded on a recording device and the recorded presentation is then played back to view the presentation. In this illustrative example, converter 210 processes the recorded presentation in accordance with the principles of the invention and provides a new signal 215 to digital device 220. Digital device 220 may be a display device, such as a CRT, computer monitor, television set, etc., or a recording device such as a computer disk drive, writeable CD-Rom, etc.

For purposes of illustrating the principles of the invention, digitally transmitted signal 128 may be recorded on digital recorder 205 The digitally collected images are then provided to converter 210 for processing in accordance with the principles of the invention. As would be understood, if the recorded presentation was transmitted as an analog signal and recorded on an analog recording device 230 then the recorded signal would first be digitized by analog/digital converter 240 before processing by convert 210. The images processed by converter 210 may then be presented digitally on digital device 220 or converted back to an analog form, using digital/analog converter 250 and presented on display device 260.

Figure 3:
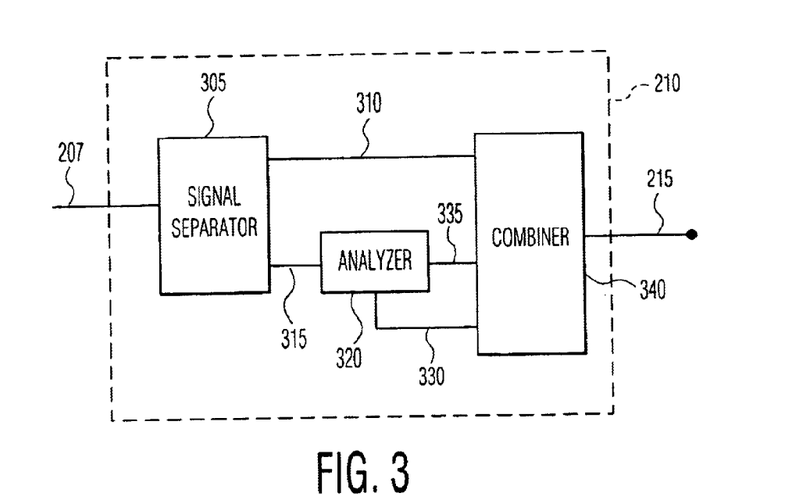
FIG. 3 illustrates an exemplary embodiment in accordance with the principles of the invention.

FIG. 3 illustrates a block diagram of one embodiment of the invention. In this embodiment, digital image 207 is separated into a theatrical-only image component 310 and a commercial-only image 315, by separator 305. Methods of identifying commercials and other non-theatrical images are well known in the art. See, for example, U.S. patent application Ser. No. 09/123,444, entitled, Apparatus and Method for Locating A Commercial Disposed With a Video Data System, filed on Jul. 28, 1998. Commercial-only image 315 is then processed by Analyzer 320, which determines whether a commercial image is precluded from being viewed. Analyzer 320 provides a "show/skip" indicator 330, which directs combiner 340 to merge commercial image 315 with theatrical-only image component 310 or to exclude image 315 from the merged signal. Accordingly, when indicator 330 is representative of a "show" indication, Combiner 340 merges the analyzed commercial-only image 335 with image 310 to form image 215. However, when indicator 330 is representative of a "skip" indication, commercial-only image 335 is excluded from combined image 215.

Figure 4:
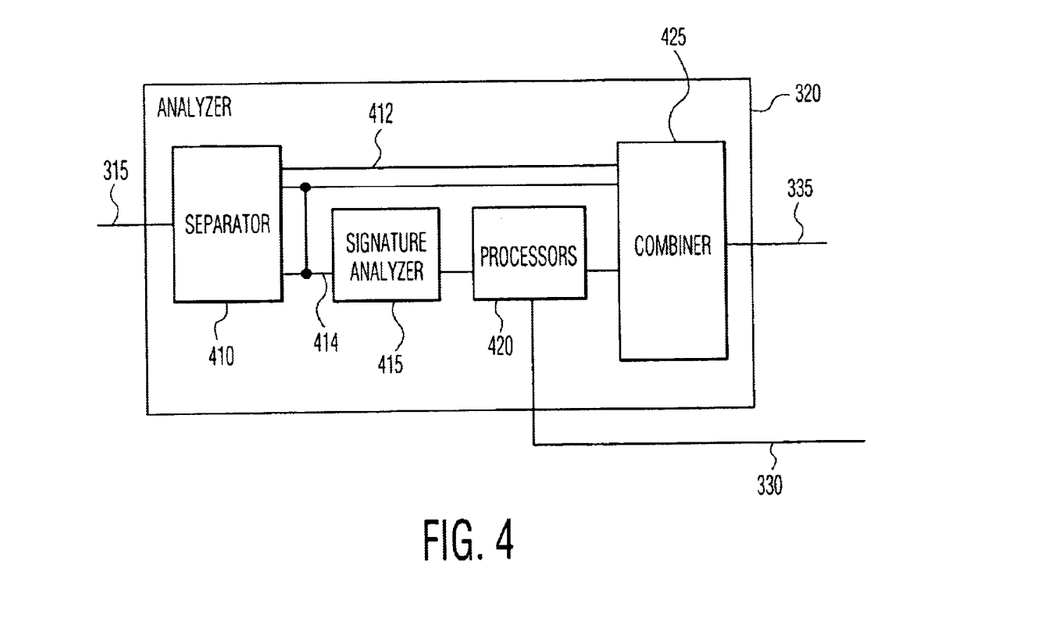
FIG. 4 represents a block diagram of the invention.

FIG. 4 illustrates, in block diagram form, Analyzer 320. In this exemplary embodiment, commercial only image 315 is provided to Separator 410. Separator 410 separates commercial only image 315 into a video only component 412 and an audio only component 414. In a preferred embodiment, a signal signature is then developed by passing audio only component 414 to Signature Analyzer 415. Signature Analyzer 415 determines a unique identification signature for each individual commercial image in commercial only image 414. Methods of developing signal image signatures are well known in the art. See, for example, U.S. Pat. No. 5,870,754, Video Retrieval of MPEG Compressed Sequence, issued Feb. 9, 1999 to Dimitrova. Processor 420 then compares the developed signature to previously determined signatures of commercial and non-theatrical images. Show/Skip signal 330 is generated by processor 420 based on operator selective criteria for the display of commercial and other non-theatrical images. Combiner 425 restores the original composite broadcast signal, illustrated as signal 335, by combining video-only component 412 and audio only component 414.

Figure 5:
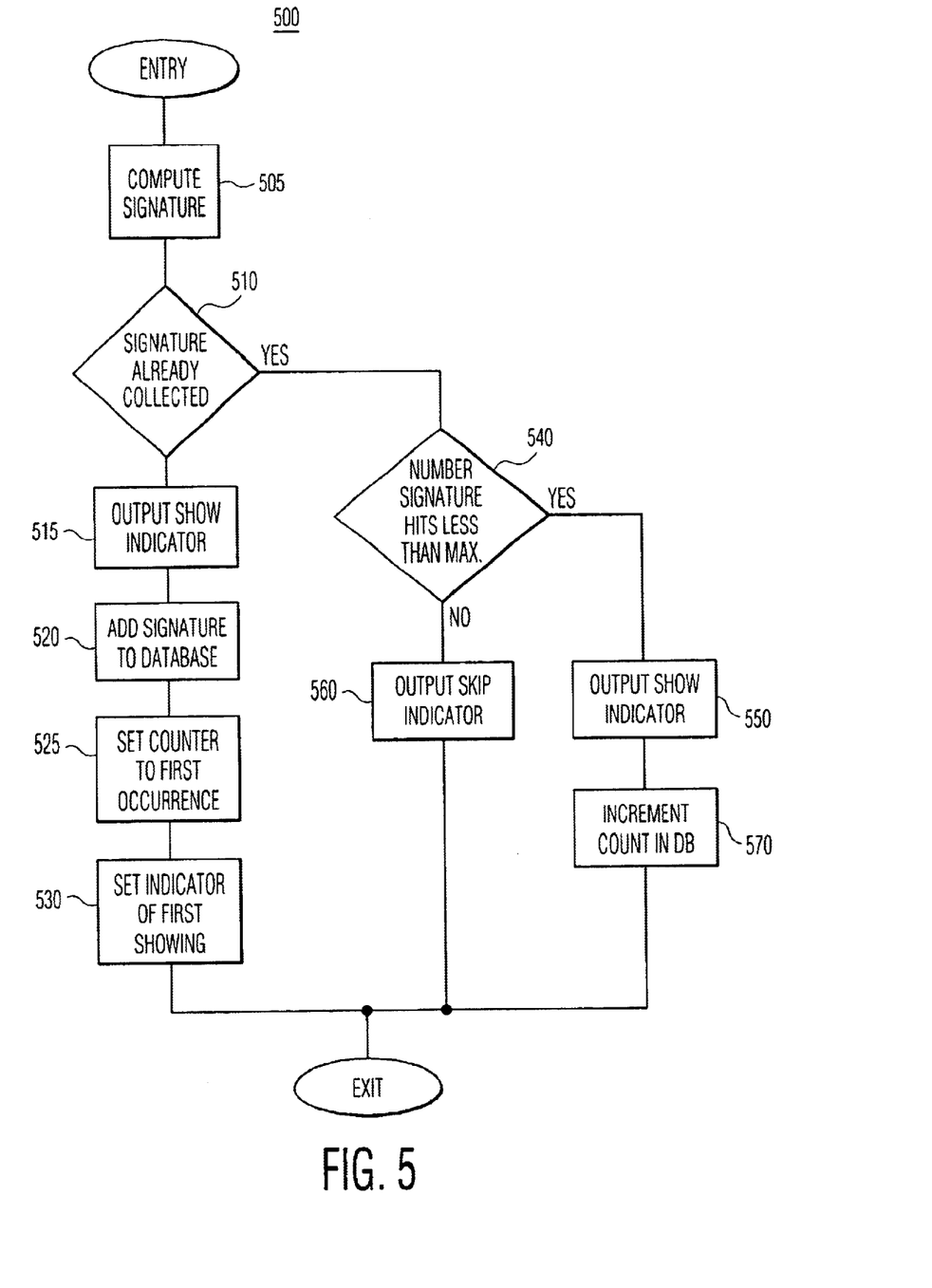
FIG. 5 represents an exemplary processing flow chart illustrating the principles of the invention.

FIG. 5 illustrates a flow chart of an exemplary processing used to determine whether to show or skip a commercial or non-theatrical image. Upon entry, a commercial image signature is determined using known signature identification techniques. A determination is then made, at block 510 as to whether the developed signature has previously been detected. If the determination is negative, i.e., the signature has not been previously detected, then an indication that the image should be shown is made available at block 515. Next, at block 520, an indicator, representative of the non-theatrical presentation signature, is included in a storage device, such as a memory, a disk, a CD-ROM, that is used to store detected signatures. A count of the number of occurrences of the newly detected signature is then set to indicate a first occurrence, at block 525. Further, a second indicator, representative of the collection of the newly detected signature, for example, a date, a time, is also stored.

When the determination at block 510 is positive, then a determination is made, at block 540, as to whether the signature has been detected and collected for a maximum number of occurrences. If it is determined that the signature has not been collected for the maximum number of occurrences, then an indication that the image associated with the signature should be shown is made available, at block 545, and the count of the number of occurrences of the specific signature is incremented, at block 550.

If, however, the determination at block 540 is negative, then an indication that the image associated with the signature should not be shown is made available, at block 560.

Figure 6A:
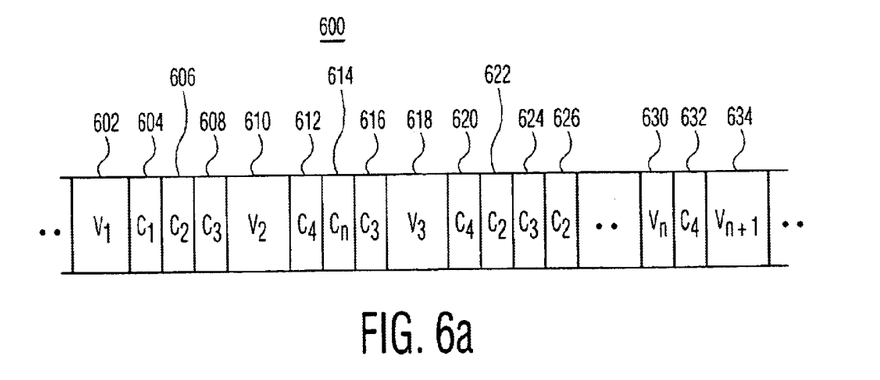
FIG. 6a illustrates an exemplary information data stream of a exemplary broadcast signal.
Figure 6B:
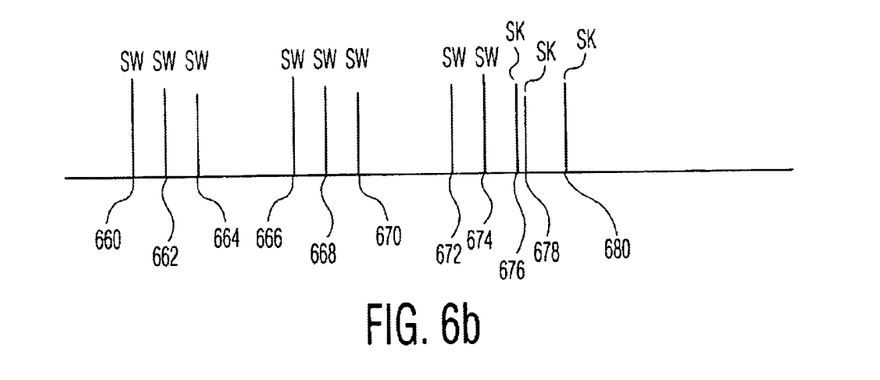
FIG. 6b illustrates a concatenation of the information data stream of FIG. 4a in accordance with the principles of the invention.
Figure 6C:
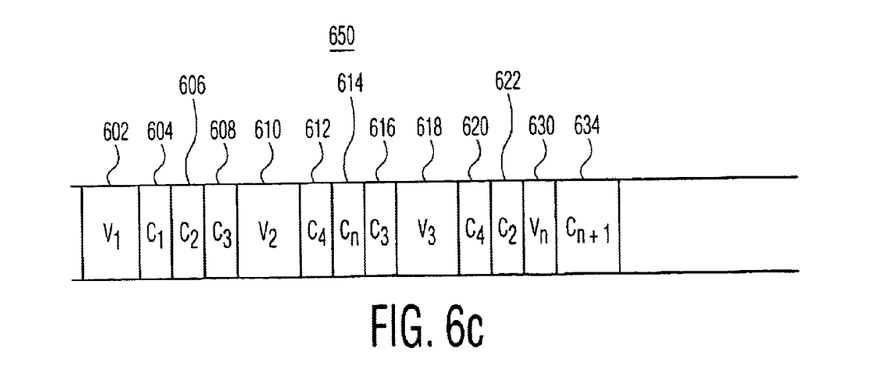
FIG. 6c illustrates signaling markers used in concatenating the information data steam of FIG. 4a in accordance with the principles of the invention.

FIGS. 6a–6c illustrate the processing of selectively limiting the number of observations of a non-theatrical image in accordance with the principles of the invention. FIG. 4a illustrates an exemplary data stream 600 comprised of images, in viewing order, $V_1$ 602, $C_1$ 604, $C_2$ 606, $C_3$ 608, $V_2$ 610, $C_4$ 612, $C_1$ 614, $C_3$ 616, $V_3$ 618, $C_4$ 620, etc, wherein images $V_1$ 602, $V_2$ 610, etc. are representative of theatrical images and images $C_1$ 604, $C_2$ 606, etc., are representative of commercial images. As would be understood, theatrical images are displayed only once in a presentation or broadcast, whereas commercial images may be repeated in the same broadcast and among a plurality of theatrical broadcasts. Hence, commercial images $C_3$ and $C_4$ in this illustrative example, are each shown twice in data steam 600 and are represented by numerals 608 and 624, and 612 and 620, respectively. FIG. 6b illustrates the occurrence of indicators that cause a commercial image to be shown or skipped in accordance with the principles of the invention. As illustrated, indicators 660, 662, and 664, respectively, as denote by the marking "SW," are made available for the occurrence of commercial images $C_1$ 604, $C_2$ 606 and $C_3$ 608 to indicate that these images are to be shown. Similarly indicators 666 and 668 are made available for the first occurrence of commercial images $C_4$ 612 and $C_n$ 614 to indicate that these images are to be shown.

Assuming, now, that the maximum number of showings of a commercial image is two showings (i.e., presentations, viewing or observations) then show indicators 670, 672, and 674 are made available for the second occurrence of commercial images $C_3$ 616, $C_4$ 620, and $C_2$ 622, respectively. However, for each of the third occurrences of commercial images $C_3$ 624 and $C_2$ 626, the processing in accordance with principles of the invention, precludes these images from being viewed or shown. In this case, indicators 676 and 680, representative of skip indicators, are made available, which causes images $C_3$ 624 and $C_2$ 626 from being included in the processed data stream. The show/skip processing determination continues for each commercial image in video stream 600 until the next theatrical image is detected. In this case, image $V_n$ 630. After image $V_n$ 630 is processed, then the third occurrence of commercial image C4, as represented by block 632, is processed and, in accordance with the principles of the invention, is precluded from being viewed. In this case, indicator 680, representative of a skip indication, causes commercial image C4, as represented by block 632, to be excluded from the processed data stream.

FIG. 6c illustrates the effect on the data stream of FIG. 6a as commercial images whose repetition in data stream 600, exceeds the maximum allowable number and are consequently excluded from the processed data stream 650. Thus, in this illustrative example, image $V_n$ 630 is viewed after only two commercial blocks have been viewed rather than after the four commercial blocks illustrated in unprocessed data stream 600. And image $V_{n+1}$ 634 is viewed immediately after image $V_n$ 630. Hence, there is a longer viewing time of the theatrical image without no commercial interruption.

As would be appreciated, the exclusion of repeated commercial images is advantageous as there is a reduction in viewing time or storage needs. If, for example, the components illustrated in FIG. 6c are time-slots, then there is a reduction in the time of the presentation as compared to that represented by data stream 600. If, however, the components illustrated represent memory allocations, then there is a reduction in the storage space, e.g., memory, necessary to store processed video image 650 as compared to unprocessed data stream 600.

Figure 7:
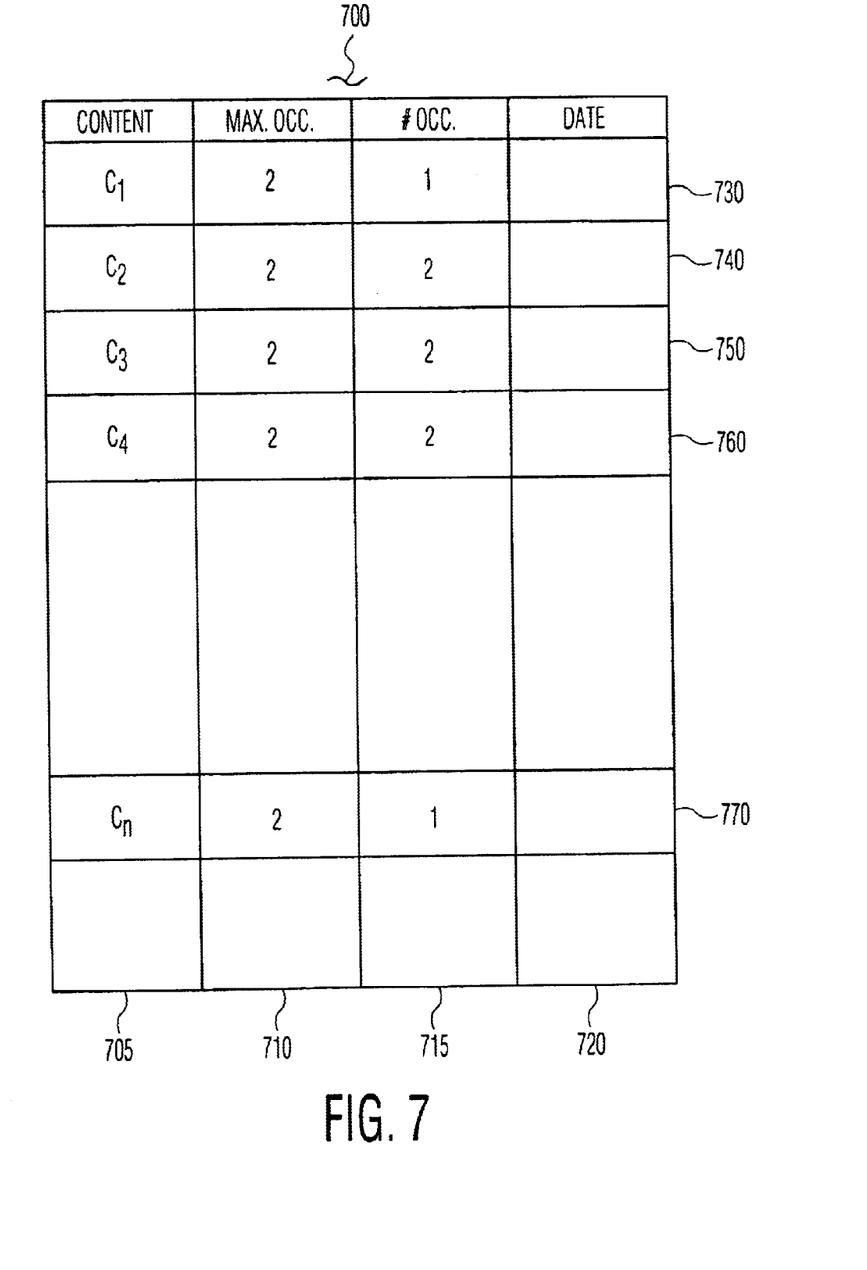
FIG. 7 illustrates an exemplary data base created in accordance with the principles of the invention.

FIG. 7 illustrates an exemplary data base dynamically constructed in accordance with the principles of the invention for the example illustrated in FIGS. 6a–6c. In this example, data base 700 is dynamically constructed to record and account for each commercial image, as represented by a developed signature, that is detected. Thus, for each new commercial signature detected, a new entry is included in data base 700. Furthermore, information items related to the commercial image, such that the maximum number of occurrence allowed, the number of occurrence of the signature, date of first entry, may also be included in data base 700. Thus, for the exemplary information items disclosed herein, data base 700 may be illustrated as containing developed signatures in column 705, a maximum number of allowed occurrences in column 710, a number of occurrences of a specific signature in column 715 and a date of first occurrence in column 720. In this illustrative example, each entry has a maximum occurrence of two showings, as represented by the number two in each row of column 710. Commercial images $C_1$ and $C_n$, illustrated in rows 730 and 770 respectively, each have been detected one time, and commercial images $C_2$, $C_3$ and $C_4$, illustrated in rows 740, 750 and 760, respectively each have been detected at least two times. Finally, an indication of the date of first occurrence, although not shown, of each commercial image is also included in column 720.

An indicator of the date of occurrence is advantageous in pruning data base 700 so as to remove signatures that have not been viewed or detected for a long period of time. For example, in accordance with the principle of the invention, the viewing of commercial image $C_3$ may be precluded not only from the video data stream 600 illustrated in FIG. 6a, but from any subsequent broadcast containing image $C_3$ for a specified finite period. Consequently, after a specified period, as measured in hours, days, or months from the stored indicator, has lapsed, the signature corresponding to image $C_3$ may be purged from data base 700.

As would be appreciated, various modifications may be incorporated into the exemplary processing flow chart illustrated in FIG. 5 that are contemplated but not illustrated. For example, the count of each occurrence may be incremented for each signature that is skipped. Further, an indicator of the date of last occurrence may be stored, which may be used as a reference to purge an image signature from the constructed data base 700. Furtherstill, the indicator of first occurrence may be a substantially large number, which is decremented for each subsequent occurrence of the detection of the image. When the number of occurrences is decreased to zero, the stored image may be removed from data base 700. Furtherstill, a viewer may selectively alter the maximum number of allowable showings of selected commercial images, or signatures, for example, using a graphic interface. The exemplary interface may illustrate a first frame, a last frame, or a key frame. This selective alteration enables the viewer to view some commercial images more times than others.

Figure 8:
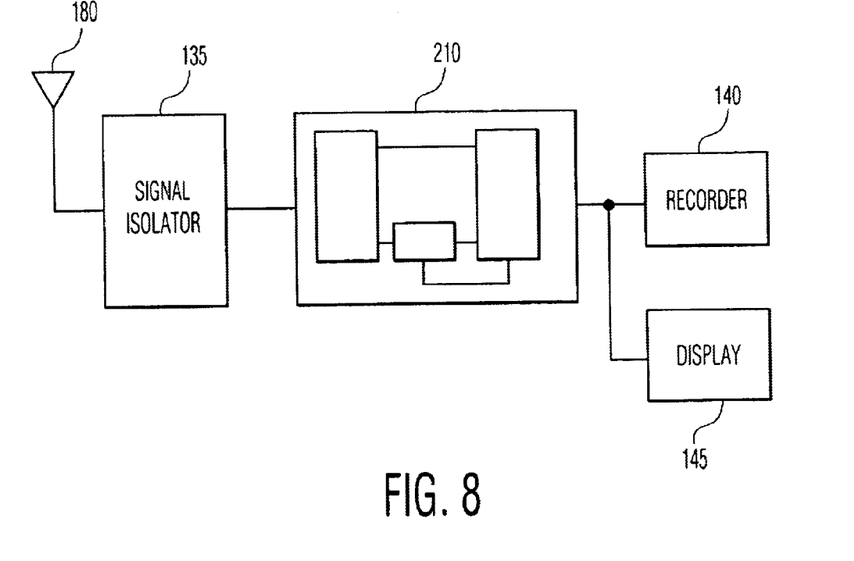
FIG. 8 illustrates a second exemplary use of the invention.

FIG. 8 illustrates another exemplary use of the invention discussed herein. In this case, the television signal containing a video data stream, similar to that illustrated in FIG. 6a, is isolated from other television signals by signal isolator 135. The isolated data stream is directed to Analyzer 210. The processed data stream output is then directed to, for example, recording device 140, for recordation of the processed data stream or to display device 145 for viewing. Storing a data stream processed in accordance with the principles of the present invention is advantageous as repetitive information items are removed for the processed data stream. Hence, less information is needed to be stored. In the case of directly viewing the processed data stream, less time is needed as repetitious materials are removed. Hence, the viewer's time in viewing a theatrical performance is reduced.

Figure 9:
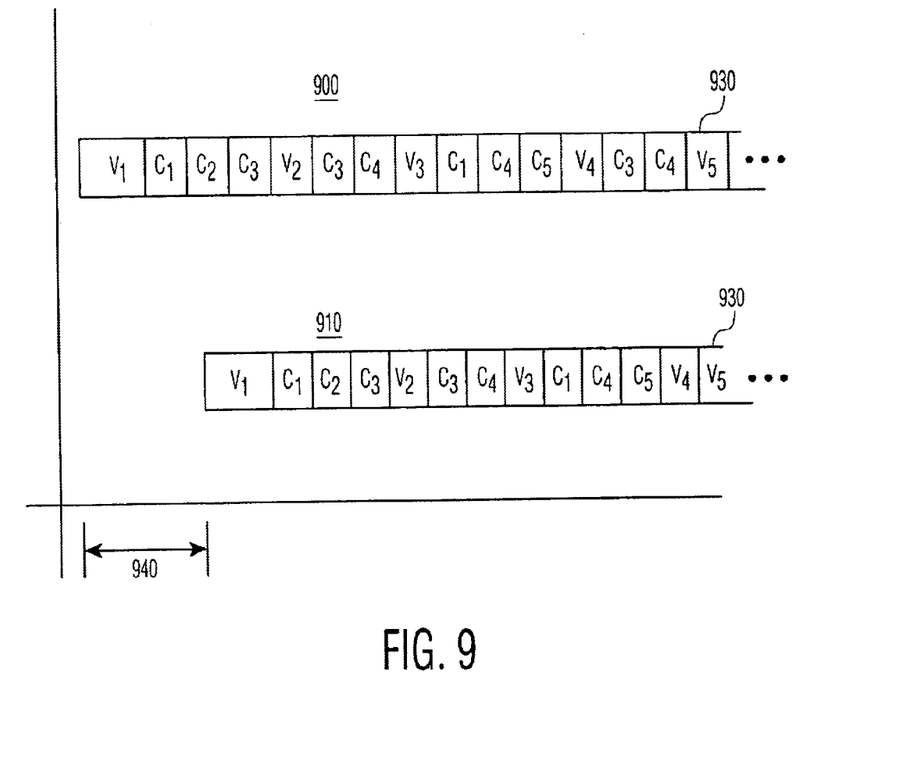
FIG. 9 illustrates an exemplary processing in accordance with the use of the invention illustrated in FIG. 8.

However, in the case of direct viewing, the exclusion of commercial images from the data stream may introduce periods wherein no images are displayed. That is, as commercial images are removed, the accumulated time removed from the data stream causes the last theatrical image to be viewed before the arrival of the next theatrical image. To overcome this problem, display device 145 may buffer the processed data stream to selectively delay the start of the presentation. FIG. 9 illustrates a delay 940 introduced in the real-time viewing of data steam 900 to account for the accumulated time lost in excluding commercial images. Data stream 910 illustrates the delayed start 940, the exclusion of images $C_4$ 915 and $C_5$ 920 and the presentation of image $V_5$ 930 immediately after image $V_4$ 925. In the alternative, during the periods wherein commercial messages are excluded from the data stream and no new theatrical image is available, the receiver may be tuned to another frequency in order to view a second theatrical presentation.

While there have been shown and described and pointed out fundamental novel features of the present invention as applied to preferred embodiments thereof, it will be understood that various omissions and substitutions and changes in the methods described, in the form and details of the devices disclosed, and in their operation, may be made by those skilled in the art without departing from the spirit of the present invention. For example, it is expressly intended that all combinations of those elements and/or method steps which perform substantially the same function is substantially the same way to achieve the same results are within the scope of the invention. Substitutions of elements from one described embodiment to another are also fully intended and contemplated.

I claim:

1. A method for selectively limiting the number of observations of repetitive materials from at least one transmission signal containing a plurality of theatrical images and a plurality of non-theatrical images, said method comprising the steps of:

decomposing each of said non-theatrical images into a plurality of component elements;

determining an identifier for each of said non-theatrical images each of said identifiers based on content of at least one component element of a corresponding one of said non theatrical image;

recording each of said identifiers not previously recorded;

developing an indicator representative of a number of observations of said non-theatrical image identifier, wherein said indicator having a first state and a second state;

merging each of said non-theatrical images with said plurality of theatrical images when said first indicator is in said first state, wherein said non-theatrical images are merged with said theatrical images in a substantially similar relation to their relation in said at least one transmission signal.

2. The method as recited in claim 1 further comprising the step of:

recording an information item representative of an occurrence of each of said identifiers not previously recorded.

3. The method as recited in claim 1 wherein the step of developing said indicator includes:

recording an information item representative of a number of each of said non-theatrical image identifiers, said second information item updated for each occurrence of said non-theatrical image identifier;

comparing said recorded second information item with a known number;

generating said indicator first state when said stored second information item is less than said known number, otherwise generating said first indicator second state.

4. The method as recited in claim 1 wherein said identifier is a signature.

5. The method as recited in claim 4 wherein said signature is determined from a component element of said non-theatrical image that is representative of an audio signal.

6. The method as recited in claim 3 wherein said known number is selectable for each of said identifiers.

7. The method as recited in claim 2 wherein said information item is a date of first occurrence of said identifier.

8. The method as recited in claim 2 wherein said information item is a date of last occurrence of said identifier.

9. The method as recited in claim 1 further comprising:

deleting said identifier after a known period in relation to said first information item.

10. The method as recited in claim 1 further comprising:

applying said accumulated recorded information items to a plurality of transmission signals.

11. An apparatus for selectively limiting the number of observations of repetitive materials from at least one transmission signal containing a plurality of theatrical images and a plurality of non-theatrical images, said apparatus comprising:

a separator to decompose each of said at least one transmission signals into said theatrical and said non-theatrical image elements;

a processor in communication with said separator; said processor operative for:

determining an identifier for each of said non-theatrical images, each of said identifiers based on content of at least one component element of said non-theatrical image;

recording each of said identifiers not previously recorded; and developing an indicator representative of a number of observations of each of said non-theatrical image identifiers, wherein said indicator has a first state and a second state;

a combiner, in communication with said separator and said processor; said combiner operative for combining each of said non-theatrical images with said plurality of theatrical images when said indicator is in said first state, wherein said non-theatrical images are merged with said theatrical images in a substantially similar relation to their relation in said at least one transmission signal.

12. The apparatus as recited in claim 11, wherein said processor is further operative for:

recording an information item representative of an occurrence of each of said identifiers not previously recorded.

13. The apparatus as recited in claim 11, wherein said processor is further operative for recording an information item representative of a number of each of said non-theatrical image identifiers, said information item updated for each occurrence of said non-theatrical image identifier;

comparing said recorded information item with a known number;

generating said indicator first state when said stored second information item is less than said known number, otherwise generating said indicator second state.

14. The apparatus as recited in claim 11 wherein said identifier is a signature.

15. The apparatus as recited in claim 14 wherein said signature is determined from said component element that is representative of an audio signal.

16. The apparatus as recited in claim 13 wherein said known number is selectable for each of said identifiers.

17. The apparatus as recited in claim 12 wherein said information item is a date of first occurrence of said identifier.

18. The apparatus as recited in claim 12 wherein said information item is a date of last occurrence of said identifier.

19. The method as recited in claim 2 further comprising the step of:

deleting each of said identifiers after a known period in relation to said information item corresponding to each of said identifiers.

20. The method as recited in claim 1 further comprising:

applying said accumulated recorded information items to a plurality of transmission signals.

21. A device for selectively limiting the number of observations of repetitive materials from a plurality of non-theatrical images, said device comprising:

a separator to decompose each of said non-theatrical images into video and audio component elements;

a processor in communication with said separator; said processor operative for:

determining an identifier for each of said non-theatrical images, each of said identifiers based on content of at least one component element of said non-theatrical image;

recording each of said identifiers not previously recorded; and developing an indicator representative of a number of observations of each of said non-theatrical image identifiers, wherein said indicator has a first state and a second state;

a combiner, in communication with said separator and said processor; said combiner operative for combining each of said non-theatrical images video and audio component elements.

22. The device as recited in claim 21, wherein said processor is further operative for:

recording an information item representative of an occurrence of each of said identifiers not previously recorded.

23. The device as recited in claim 21, wherein said processor is further operative for recording an information item representative of a number of each of said non-theatrical image identifiers, said information item updated for each occurrence of said non-theatrical image identifier;

comparing said recorded information item with a known number;

generating said indicator first state when said stored second information item is less than said known number, otherwise generating said indicator second state.

24. The device as recited in claim 21 wherein said identifier is a signature.

25. The device as recited in claim 24 wherein said signature is determined from said component element that is representative of an audio signal.

26. The device as recited in claim 23 wherein said known number is selectable for each of said identifiers.

27. The device as recited in claim 22 wherein said information item is a date of first occurrence of said identifier.

28. The device as recited in claim 22 wherein said information item is a date of last occurrence of said identifier.

\* \* \* \* \*